(12) United States Patent
Kuo

(10) Patent No.: US 9,120,259 B2
(45) Date of Patent: Sep. 1, 2015

(54) COUNTERWEIGHT STRUCTURE OF A TRAFFIC CONE

(71) Applicant: JING NAN TRAFFIC ENGINEERING CO., LTD., Changhua County (TW)

(72) Inventor: Shu-Nan Kuo, Changhua County (TW)

(73) Assignee: JING NAN TRAFFIC ENGINEERING CO., LTD., Changhua County (TW)

( * ) Notice: Subject to any disclaimer, the term of this patent is extended or adjusted under 35 U.S.C. 154(b) by 296 days.

(21) Appl. No.: 13/862,569

(22) Filed: Apr. 15, 2013

(65) Prior Publication Data

US 2014/0305366 A1  Oct. 16, 2014

(51) Int. Cl.
   *E01F 9/012* (2006.01)
   *B29C 45/14* (2006.01)
   *B29L 22/00* (2006.01)

(52) U.S. Cl.
   CPC ....... *B29C 45/1418* (2013.01); *B29C 45/14311* (2013.01); *B29C 45/14344* (2013.01); *E01F 9/0122* (2013.01); *B29L 2022/00* (2013.01)

(58) Field of Classification Search
   CPC ....... E01F 9/012; E01F 9/0122; E01F 9/0124; E01F 13/02; E01F 13/04; B29C 45/14; B29C 45/1418; B29C 45/14311; B29C 45/14344; B29L 2022/00
   USPC .......................... 116/63 C, 63 P; 404/6, 9, 10
   See application file for complete search history.

(56) References Cited

U.S. PATENT DOCUMENTS

| | | | | |
|---|---|---|---|---|
| 3,451,368 A * | 6/1969 | Keats | | 116/63 R |
| 6,929,419 B1 * | 8/2005 | Kuo | | 404/6 |
| 7,056,055 B1 * | 6/2006 | Kuo | | 404/9 |
| 7,338,229 B1 * | 3/2008 | Kuo | | 404/9 |
| 8,770,137 B2 * | 7/2014 | Kuo | | 116/63 C |
| 8,925,477 B2 * | 1/2015 | Wang | | 116/63 C |
| 2008/0011221 A1 * | 1/2008 | Dvoracek | | 116/63 C |

FOREIGN PATENT DOCUMENTS

| | | | | |
|---|---|---|---|---|
| GB | 2077332 A * | 12/1981 | | B60Q 7/00 |
| JP | 2011214295 A * | 10/2011 | | E01F 9/012 |
| TW | 300685 U * | 11/2006 | | E01F 9/012 |
| TW | 314761 U * | 7/2007 | | E01F 9/012 |
| TW | 341714 U * | 10/2008 | | E01F 9/012 |
| TW | 384208 U * | 7/2010 | | E01F 9/012 |

* cited by examiner

*Primary Examiner* — R. A. Smith

(57) ABSTRACT

A counterweight structure of a traffic cone contains a base pre-molded and placed into a conical mold so as to injection mold a conical post. The base includes a groove for connecting with the conical post, a connecting piece mounted around the groove, and a plurality of retaining tabs arranged on the connecting piece. Each retaining tab has a neck portion coupled with the groove, and between any two abutting retaining tabs is defined an elongated hole communicating with the connecting piece, two orifices are arranged on two sides of the neck of the each retaining tab and communicate with the connecting piece, such that when the conical post is injection molded to cover the base, the connecting piece, the plurality of retaining tabs and a plurality of retaining tabs horizontally retain together, and a plurality of orifices are provided to vertically connect the conical post and the base together.

5 Claims, 5 Drawing Sheets

COUNTERWEIGHT STRUCTURE OF A TRAFFIC CONE

FIELD OF THE INVENTION

The present invention relates to a counterweight structure, and more particularly to a counterweight structure of a traffic cone.

BACKGROUND OF THE INVENTION

Conventional traffic cone contains a base and a conical post connected with the base by ways of dovetail holes, i.e., a plurality of dovetail holes are used to connect the conical post with the base. However such a connection is applied to horizontally connect the conical post with the base, so the conical post cannot connect with the base vertically, thus reducing a connecting effect.

The present invention has arisen to mitigate and/or obviate the afore-described disadvantages.

SUMMARY OF THE INVENTION

The primary object of the present invention is to provide a counterweight structure of a traffic cone in which the conical post is connected with the base securely.

To obtain the above objectives, a counterweight structure of a traffic cone provided by the present invention contains:

a base pre-molded and placed into a conical mold so as to further injection mold a conical post, wherein the base includes a circular opening defined around a central portion thereof so as to connect with the conical post, a connecting piece mounted around an outer peripheral side of the opening, and a plurality of retaining tabs arranged on a top surface and a bottom surface of the connecting piece and spaced apart from each other, each retaining tab has a neck portion coupled with the outer edge of the opening, and between any two abutting retaining tabs is defined an elongated hole, two orifices are arranged on two sides of the neck of the each retaining tab and are in communication with the connecting piece, such that when the conical post is injection molded to cover the base, the connecting piece, the plurality of retaining tabs and a plurality of retaining tabs horizontally retain together, and a plurality of orifices are provided to vertically connect the conical post and the base together.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
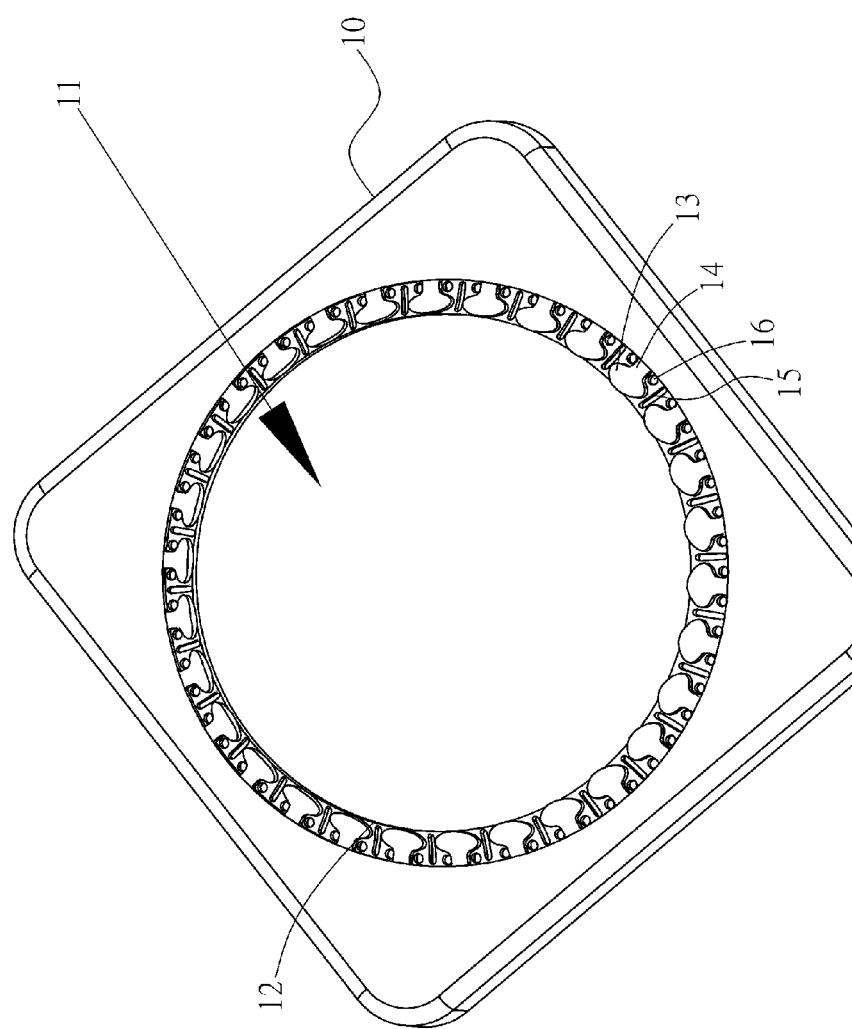
FIG. 1 is a perspective view showing the assembly of a traffic cone according to a preferred embodiment of the present invention.
Figure 2:
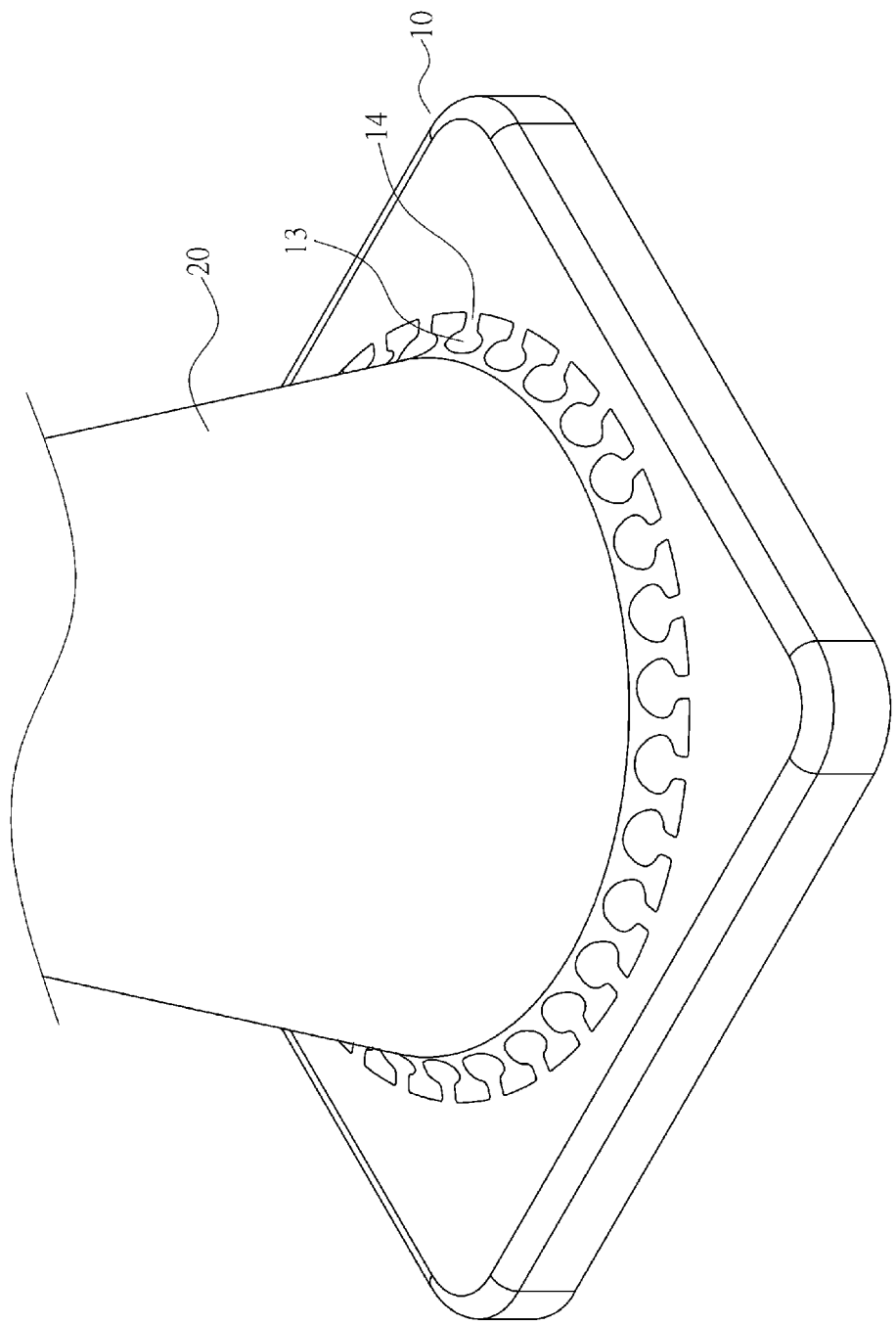
FIG. 2 is another perspective view showing the assembly of the traffic cone according to the preferred embodiment of the present invention.
Figure 3:
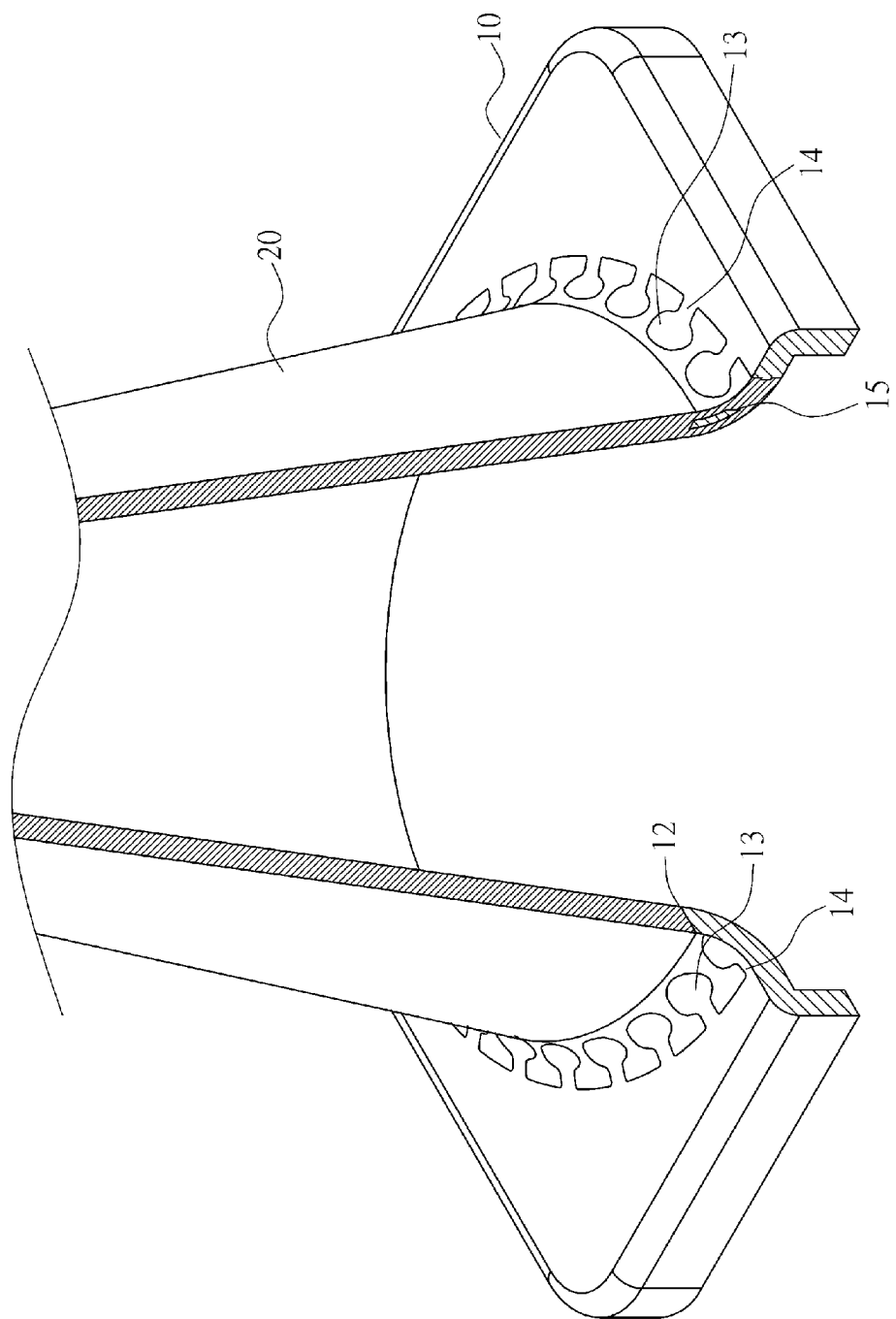
FIG. 3 is a cross-sectional perspective view showing a part of the traffic cone according to the preferred embodiment of the present invention.
Figure 4:
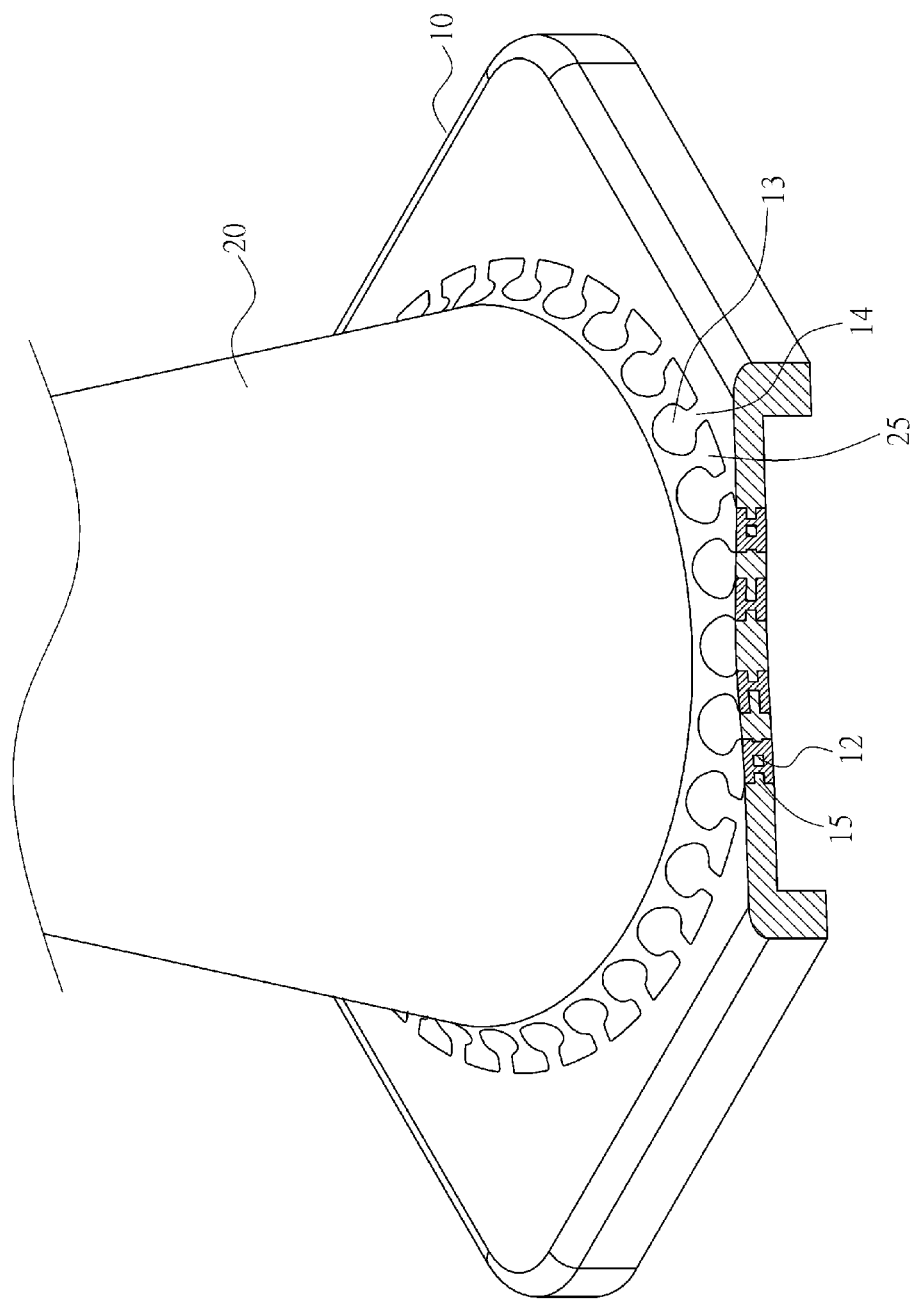
FIG. 4 is another cross-sectional perspective view showing a part of the traffic cone according to the preferred embodiment of the present invention.
Figure 5:
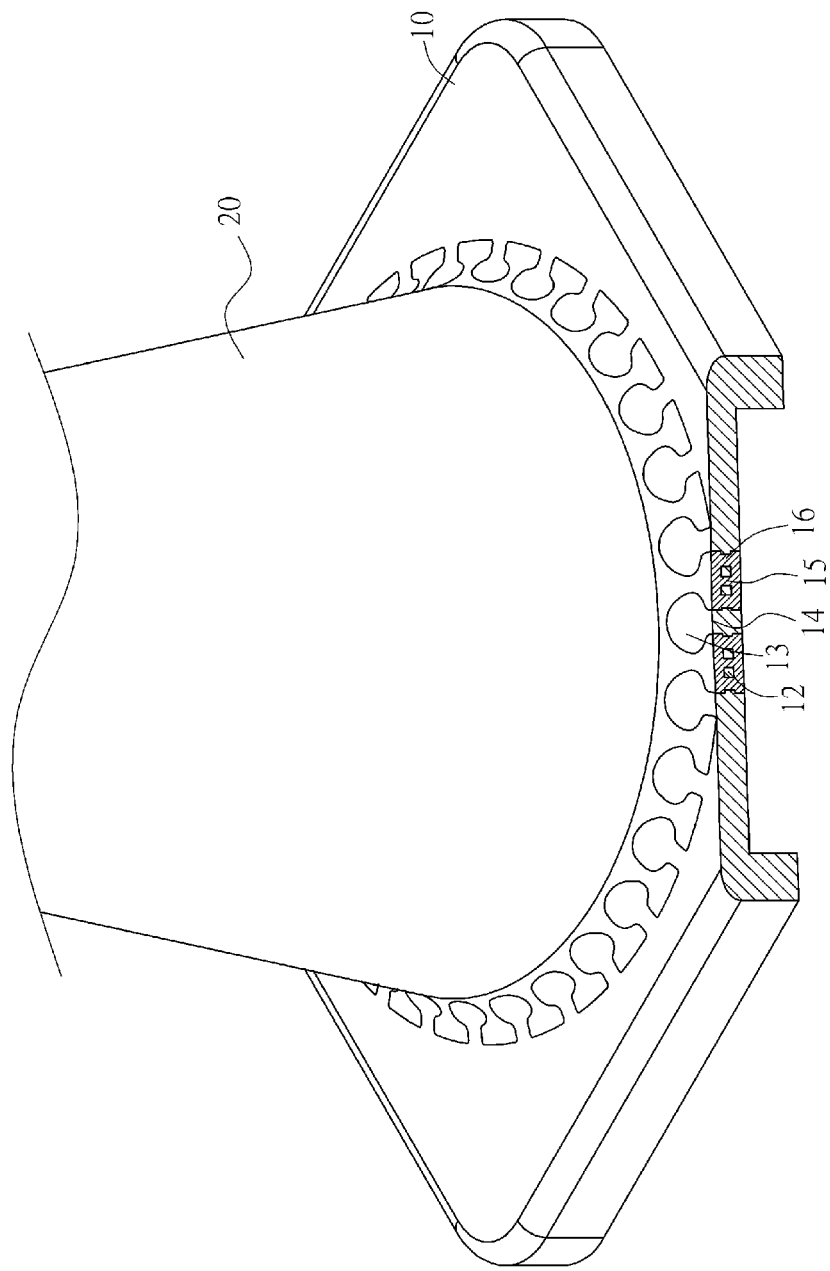
FIG. 5 is also another cross-sectional perspective view showing a part of the traffic cone according to the preferred embodiment of the present invention.

FIG. 1 is a perspective view showing the assembly of a traffic cone according to a preferred embodiment of the present invention. FIG. 2 is another perspective view showing the assembly of the traffic cone according to the preferred embodiment of the present invention. FIG. 3 is a cross-sectional perspective view showing a part of the traffic cone according to the preferred embodiment of the present invention. FIG. 4 is another cross-sectional perspective view showing a part of the traffic cone according to the preferred embodiment of the present invention. FIG. 5 is also another cross-sectional perspective view showing a part of the traffic cone according to the preferred embodiment of the present invention. With reference to FIGS. 1-5, a traffic cone according to the preferred embodiment of the present invention comprises a base 10 pre-molded and placed into a conical mold so as to further injection mold a conical post 20, wherein the base 10 includes a counterweight block formed by a mold, a circular opening 11 defined around a central portion thereof so as to connect with the conical post 20, a connecting piece 12 formed around an outer peripheral side of the opening 11, and a plurality of retaining tabs 13 arranged on a top surface and a bottom surface of the connecting piece 12 and evenly spaced apart from one another; each retaining tab 13 is oblong and has a neck portion 14 coupled with the outer edge of the opening 11, and a smoothly curved structure connecting the conical post and the base is formed around each neck portion 14, each retaining tab 13, and the connecting piece of the opening 11, and between every two adjacent retaining tabs 13 is an elongated hole 15 which is located vertically in relationship to the connecting piece 12, two orifices 16 are arranged on two sides of the neck 14 of each retaining tab 13 on the connecting piece 12 and are used to form a vertical connection between the conical post 20 and the base 10.

Thereby, in an injection molding process for the formation of the conical post 20, the base 10 is placed into a movable mold holder and is connected with a module block of the movable mold holder, and then the movable mold holder is moved to a fixed mold so as to close die, thereafter the conical post 20 is injection molded from good liquidity material. After the conical post 20 is injection molded, it is coupled with the base 10 by way of injecting the material through the elongated hole 15 and the two orifices 16 and forming interlocking tabs 25 around the connecting piece 12, and each retaining tab 13 and the neck portion 14 connected with the connecting piece 12, such that the conical post 20 is connected with the base 10 securely. In addition, a shape of each retaining tab 13, interlocking tab 25 and the neck portion 14 enhances an aesthetics appearance of the traffic cone.

Also, the connecting piece 12 and the retaining tabs 13 of the base 10 extend upward in a curvature so that a coupling portion of the conical post 20 transitions to a smooth connection between the conical post 20 and the base 10, thus enhancing aesthetics appearance and lowering production material.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A traffic cone comprising: a base pre-molded and placed into a conical mold so as to further injection mold a conical post, wherein a circular opening is defined around a central portion of said base so as to connect with the conical post by way of a connecting piece mounted around an outer peripheral side of the opening, and a plurality of retaining tabs arranged on a top surface and a bottom surface of the connecting piece and evenly spaced apart from one another with each retaining tab having a neck portion coupled with the outer edge of the opening, and an elongated hole arranged between every two adjacent retaining tabs, and two orifices arranged on two sides of the neck of each retaining tab on the connecting piece, such that the conical post being injection molded onto the base, around the connecting piece and the plurality of retaining tabs, and through the plurality of elongated holes and orifices leads to the forming of a plurality of interlocking tabs bonding horizontally, and a plurality of vertically bonding structures through the elongated holes and orifices to connect the conical post and the base together.

2. The traffic cone as claimed in claim 1, wherein the each retaining tab is oblong.

3. The traffic cone as claimed in claim 1, wherein the elongated hole is located vertically in between two adjacent retaining tabs on the connecting piece.

4. The traffic cone as claimed in claim 1, wherein a smoothly curved structure connecting the conical post and the base is formed around the neck and body of each retaining tab and the connecting piece of the opening.

5. The traffic cone as claimed in claim 1, wherein the connecting piece and each retaining tab of the base extend upward in a curvature so that a coupling portion of the conical post transitions to a smooth connection between the conical post and the base.

* * * * *